US011670071B2

(12) United States Patent
Fu et al.

(10) Patent No.: US 11,670,071 B2
(45) Date of Patent: Jun. 6, 2023

(54) FINE-GRAINED IMAGE RECOGNITION

(71) Applicant: MICROSOFT TECHNOLOGY LICENSING, LLC, Redmond, WA (US)

(72) Inventors: Jianlong Fu, Redmond, WA (US); Tao Mei, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 408 days.

(21) Appl. No.: 16/631,923

(22) PCT Filed: May 29, 2018

(86) PCT No.: PCT/US2018/034810
§ 371 (c)(1),
(2) Date: Jan. 17, 2020

(87) PCT Pub. No.: WO2019/018063
PCT Pub. Date: Jan. 24, 2019

(65) Prior Publication Data
US 2020/0160124 A1 May 21, 2020

(30) Foreign Application Priority Data
Jul. 19, 2017 (CN) .......................... 201710592777.5

(51) Int. Cl.
*G06V 30/194* (2022.01)
*G06T 7/11* (2017.01)
(Continued)

(52) U.S. Cl.
CPC .............. *G06V 10/454* (2022.01); *G06T 1/20* (2013.01); *G06T 1/60* (2013.01); *G06T 7/11* (2017.01);
(Continued)

(58) Field of Classification Search
CPC .... G06V 30/194; G06V 10/751; G06V 10/95; G06T 7/11; G06T 1/20; G06T 1/60;
(Continued)

(56) References Cited

U.S. PATENT DOCUMENTS 8,369,652 B1 2/2013 Khosla et al.
9,262,698 B1 2/2016 George et al.
(Continued)

FOREIGN PATENT DOCUMENTS

CN 102800080 A 11/2012
CN 103824054 A 5/2014
(Continued)

OTHER PUBLICATIONS

Shaoli Huang et al: "Part-Stacked CNN for Fine-Grained visual Categorization",Jun. 27, 2016 (Jun. 27, 2016), 2016 IEEE Conference on Computer Vision and Pattern Recognition (CVPR), 2016, pp. 1173-1182 (Year: 2016).*
(Continued)

*Primary Examiner* — Gandhi Thirugnanam

(57) ABSTRACT

In accordance with implementations of the subject matter described herein, a solution for fine-grained image recognition is proposed. This solution includes extracting a global feature of an image using a first sub-network of a first learning network; determining a first attention region of the image based on the global feature using a second sub-network of the first learning network, the first attention region including a discriminative portion of an object in the image; extracting a first local feature of the first attention region using a first sub-network of a second learning network; and determining a category of the object in the image based at least in part on the first local feature. Through this solution, it is possible to localize an image region at a finer
(Continued)

scale accurately such that a local feature at a fine scale can be obtained for object recognition.

20 Claims, 4 Drawing Sheets

(51) Int. Cl.
```
G06T 1/20      (2006.01)
G06T 1/60      (2006.01)
G06V 10/94     (2022.01)
G06V 10/44     (2022.01)
G06V 10/764    (2022.01)
G06V 10/82     (2022.01)
```
(52) U.S. Cl.
CPC ............ *G06V 10/764* (2022.01); *G06V 10/82* (2022.01); *G06V 10/95* (2022.01)

(58) Field of Classification Search
CPC ...... G06K 9/62; G06K 9/6217; G06K 9/6256; G06N 3/0454; G06N 3/084; G06N 3/04; G06N 3/02; G06N 3/08
See application file for complete search history.

(56) References Cited

U.S. PATENT DOCUMENTS

| | | | |
|---|---|---|---|
| 9,275,316 B2 | 3/2016 | Bruwer et al. | |
| 2012/0294476 A1 | 11/2012 | Wei et al. | |
| 2014/0063275 A1 | 3/2014 | Krahenbuhl et al. | |
| 2016/0210533 A1 | 7/2016 | Kiapour et al. | |
| 2016/0307072 A1 | 10/2016 | Zhou et al. | |
| 2020/0117954 A1* | 4/2020 | Jiang et al. | G06K 9/6262 382/157 |

FOREIGN PATENT DOCUMENTS

| | | | |
|---|---|---|---|
| CN | 104268591 A | 1/2015 | |
| CN | 105975941 A | 9/2016 | |
| CN | 106355188 A | 1/2017 | |
| CN | 106408610 A | 2/2017 | |
| CN | 106446930 A | 2/2017 | |
| CN | 106650699 A | 5/2017 | |
| WO | 2014200742 A1 | 12/2014 | |
| WO | 2016118332 A1 | 7/2016 | |
| WO | WO 2016/118332 A1 * | 7/2016 | ............ G06K 9/6269 |

OTHER PUBLICATIONS

Zhao Bo et al: "A survey on deep learning-based fine-grained object classification and semantic segmentation", Jan. 18, 2017 (Jan. 18, 2017), International Journal of Automation and Computing, Zhongguo Kexue Zazhishe, CN, vol. 14, No. 2, pp. 119-135 (Year: 2017) (Year: 2017).*
Zhao Bo et al: "A survey on deep learning-based fine-grained object classification and semantic segmentation", Jan. 18, 2017 (Jan. 18, 2017), International Journal of Automation and Computing, Zhongguo Kexue Zazhishe, CN, vol. 14, No. 2, pp. 119-135 (Year: 2017).*
Lin Di et al: "Deep LAC: Deep localization, alignment and classification for fine-grained recognition", Jun. 7, 2015 (Jun. 7, 2015), 2015 IEEE Conference on Computer Vision and Pattern Recognition (CVPR), IEEE, pp. 1666-1674 (Year: 2015).*
Tianjun Xiao et al:, "The application of two-level attention models in deep convolutional neural network for fine-grained image classification", Jun. 7, 2015 (Jun. 7, 2015), 2015 IEEE Conference on Computer Vision and Pattern Recognition (CVPR), IEEE, pp. 842-850 (Year: 2015).*
Ning Zhang et al:, "Part-Based R-CNNs for Fine-Grained Category Detection", Jan. 1, 2014 (Jan. 1, 2014),In: "Medical image computing and computer-assisted intervention—MICCAI 2015: 18th international conference, Munich, Germany, Oct. 5-9, 2015; proceedings" (Year: 2014).*
Krause, et al., "3D Object Representations for Fine-Grained Categorization", In Proceedings of IEEE International Conference on Computer Vision Workshops, Dec. 2, 2013, pp. 554-561.
Zhao, et al., "A Survey on Deep Learning-based fine-Grained Object Classification and Semantic Segmentation", In International Journal of Automation and Computing, vol. 4, Issue 2, Jan. 18, 2017, 17 Pages.
Nilsback, et al., "A Visual Vocabulary for Flower Classification", In Proceedings of the IEEE Computer Society Conference on Computer Vision and Pattern Recognition, Jun. 2006, 8 Pages.
Wang, et al., "Beyond Object Recognition: Visual Sentiment Analysis with Deep Coupled Adjective and Noun Neural Networks", In Proceedings of the Twenty-Fifth International Joint Conference on Artificial Intelligence, Jul. 9, 2016, 7 Pages.
Lin, et al., "Bilinear CNN Models for Fine-Grained Visual Recognition", In Proceedings of the IEEE International Conference on Computer Vision, Dec. 2015, pp. 1449-1457.
Branson, et al., "Bird Species Categorization Using Pose Normalized Deep Convolutional Nets", In Proceedings of the British Machine Vision Conference, Sep. 1, 2014, 14 Pages.
Welinder, et al., "Caltech-UCSD Birds 200", In Technical Report CNS-TR-2010-001, 2010, 15 Pages.
Hendricks, et al., "Deep Compositional Captioning: Describing Novel Object Categories without Paired Training Data", In Proceedings of IEEE Conference on Computer Vision and Pattern Recognition, Jun. 27, 2016, 10 Pages.
Lin, et al., "Deep LAC: Deep Localization, Alignment and Classification for Fine-Grained Recognition", In IEEE Conference on Computer Vision and Pattern Recognition, Jun. 7, 2015, pp. 1666-1674.
He, et al., "Deep Residual Learning for Image Recognition", In Proceedings of the IEEE Conference on Computer Vision and Pattern Recognition, Jun. 26, 2016, pp. 770-778.
Johnson, et al., "DenseCap: Fully Convolutional Localization Networks for Dense Captioning", In Proceedings of IEEE Conference on Computer Vision and Pattern Recognition, Jun. 26, 2016, pp. 4565-4574.
Zhao, et al., "Diversified Visual Attention Networks for fine-Grained Object Classification", In Journal of IEEE Transactions on Multimedia, vol. 19, Issue 6, Jan. 2017, 10 Pages.
Girshick, Ross, "Fast R-CNN", In Proceedings of The IEEE International Conference on Computer Vision, Dec. 7, 2015, pp. 1440-1448.
Krause, et al., "Fine-Grained Recognition Without Part Annotations", Proceedings of the IEEE Conference on Computer Vision and Pattern Recognition, Jun. 2015, pp. 5546-5555.
Perronnin, et al., "Fisher Vectors Meet Neural networks: A Hybrid Classification Architecture", In Proceedings of the IEEE Conference on Computer Vision and Pattern Recognition, Jun. 2015, pp. 3743-3752.
Liu, et al., "Fully Convolutional Attention Localization Networks: Efficient Attention Localization for Fine-Grained Recognition", In Journal of the Computing Research Repository, Mar. 2016, 10 Pages.
Fu, et al., "Image Tag Refinement With View-Dependent Concept Representations", In Journal of IEEE Transactions on Circuits and Systems for Video Technology, vol. 25, Issue 8, Aug. 2015, pp. 1409-1422.
Krizhevsky, et al., "ImageNet Classification with Deep Convolutional Neural Networks", In Proceedings of Twenty-sixth Conference on Neural Information Processing Systems, Dec. 3, 2012, 9 Pages.
"International Search Report and Written Opinion Issued in PCT Application No. PCT/US18/034810", dated Aug. 30, 2018, 15 Pages.
Reed, et al., "Learning Deep Representations of Fine-Grained Visual Descriptions", In Proceedings of the IEEE Conference on Computer Vision and Pattern Recognition, Jun. 2016, pp. 49-58.

(56) References Cited

OTHER PUBLICATIONS

Rumelhart, et al., "Learning Representations by Back-Propagating Errors", In Journal of Nature, vol. 323, Issue 6088, Oct. 9, 1986, pp. 533-536.

Wang, et al., "Multiple Granularity Descriptors for Fine-Grained Categorization", In Proceedings of the IEEE International Conference on Computer Vision, Dec. 2015, pp. 2399-2406.

Ba, et al., "Multiple Object Recognition with Visual Attention", In Proceedings of the Computing Research Repository, Dec. 24, 2014, pp. 1-10.

Simon, et al., "Neural Activation Constellations: Unsupervised part model discovery with Convolutional Networks", In Proceedings of the IEEE International Conference on Computer Vision, Dec. 2015, pp. 1143-1151.

Khosla, et al., "Novel Dataset for Fine-Grained Image Categorization", In Proceedings of 13th International Conference on Computer Vision, Nov. 6, 2011, 2 Pages.

Zhang, et al., "Part-Based R-CNNs for Fine-Grained Category Detection", In Proceeding of European Conference on Computer Vision, vol. 8689, Sep. 2014, 16 Pages.

Huang, et al., "Part-Stacked CNN for Fine-Grained Visual Categorization", In Proceedings of the IEEE Conference on Computer Vision and Pattern Recognition, Jun. 26, 2016, pp. 1173-1182.

Zhang, et al., "Picking Deep filter Responses for Fine-Grained Image Recognition", In Proceedings of the IEEE Conference on Computer Vision and Pattern Recognition, Jun. 26, 2016, pp. 1134-1142.

Haque, et al., "Recurrent Attention Models for Depth-Based Person Identification", In Proceedings of IEEE Conference on Computer Vision and Pattern Recognition, Jun. 27, 2016, 10 Pages.

Mnih, et al., "Recurrent Models of Visual Attention", In Proceedings of Annual Conference on Neural Information Processing Systems, Dec. 8, 2014, 9 Pages.

Fu, et al., "Relaxing from Vocabulary: Robust Weakly-Supervised Deep Learning for Vocabulary-Free Image Tagging", In Proceedings of the IEEE International Conference on Computer Vision, Dec. 7, 2015, pp. 1985-1993.

Girshick, et al., "Rich Feature Hierarchies for Accurate Object Detection and Semantic Segmentation—Tech Report (v5)", In Proceedings of the IEEE Conference on Computer Vision and Pattern Recognition, Jun. 23, 2014, 8 Pages.

Jaderberg, et al., "Spatial Transformer Networks", In Proceedings of Advances in Neural Information Processing Systems, Dec. 7, 2015, 9 Pages.

Zhang, et al., "SPDA-CNN: Unifying Semantic Part Detection and Abstraction for Fine-Grained Recognition", In Proceedings of the IEEE Conference on Computer Vision and Pattern Recognition, Jun. 26, 2016, pp. 1143-1152.

Cortes, et al., "Support-Vector Networks", In Journal of Machine Learning, vol. 20, Issue 3, Sep. 15, 1995, pp. 273-297.

Fu, et al., "Tagging Personal Photos with Transfer Deep Learning", In Proceedings of the 24th International Conference on World Wide Web, May 18, 2015, pp. 344-354.

Xiao, et al., "The Application of Two-level Attention Models in Deep Convolutional Neural Network for Fine-grained Image Classification", In Proceedings of the IEEE Conference on Computer Vision and Pattern Recognition, Jun. 7, 2015, pp. 842-850.

Parkhi, et al., "The Truth about Cats and Dogs", In Proceedings of IEEE International Conference on Computer Vision, Nov. 6, 2011, 8 Pages.

Krause, et al., "The Unreasonable Effectiveness of Noisy Data for Fine-Grained Recognition", In Proceedings of 14th European Conference on Computer Vision, Oct. 11, 2016, 26 Pages.

Simonyan, et al., "Very Deep Convolutional Networks for Large-Scale Image Recognition", In Proceedings of 3rd International Conference on Learning Representations, May 7, 2015, 14 Pages.

Fu, et al., "Look Closer to See Better: Recurrent Attention Convolutional Neural Network for Fine-grained Image Recognition", In IEEE Conference on Computer Vision and Pattern Recognition, Jul. 21, 2017, 9 Pages.

"Office Action Issued in European Patent Application No. 18731322.6", dated Feb. 3, 2022, 5 Pages.

"Office Action and Search Report Issued in Chinese Patent Application No. 201710592777.5", dated Jun. 28, 2021, 34 Pages.

"Third Office Action Issued in China Patent Application No. 201710592777.5", dated Jun. 22, 2022, 41 Pages.

Wei, et al., "Multi-feature Double Matching Verification for Driver Face Fusion Detection", In Journal of Opto-Electronic Engineering, vol. 36, Issue 11, Nov. 2009, 8 Pages.

"Second Office Action Issued in Chinese Patent Application No. 201710592777.5", dated Feb. 7, 2022, 47 Pages.

"Office Action and Search Report Issued in China Patent Application No. 201710592777.5", dated Jan. 20, 2023, 53 Pages.

\* cited by examiner

FINE-GRAINED IMAGE RECOGNITION

This application is a U.S. National Stage Application of PCT/US2018/034810, May 29, 2018, which claims priority to Chinese Patent Application No. 201710592777.5, filed Jul. 19, 2017, which applications are hereby incorporated by reference. To the extent appropriate, a claim of priority is made to each of the above disclosed applications.

BACKGROUND

Recognizing fine-grained categories of images by computer techniques has attracted extensive attention. Examples for the fine-grained image recognition include, but are not limited to, specific categories of various living creatures, various brands and models of articles, medical cell types, and the like. The subtle differences of objects in certain fine-grained categories can be only recognized by domain experts. For example, the overall features of some birds are quite similar, and the differences only lie in the color, texture, or shape of a certain region. Different from general recognition (which only differentiates the categories of objects with outstanding overall differences, such as birds, flowers, vehicles, and the like), the fine-grained image recognition should be capable of localizing the regions with a subtle visual difference in the objects of different fine-grained categories and accurately characterizing the features of these regions. The fine-grained image recognition can benefit a wide variety of applications, e.g., expert-level image recognition, rich image captioning, medical diagnosis, and so on.

SUMMARY

In accordance with implementations of the subject matter described herein, a solution for fine-grained image recognition is proposed. This solution includes extracting a global feature of an image using a first sub-network of a first learning network; determining a first attention region of the image based on the global feature using a second sub-network of the first learning network, the first attention region including a discriminative portion of an object in the image; extracting a first local feature of the first attention region using a first sub-network of a second learning network; and determining a category of the object in the image based at least in part on the first local feature. Through this solution, it is possible to localize an image region at a finer scale accurately such that a local feature at a fine scale can be obtained for object recognition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, identical or similar reference signs are used to represent identical or similar elements.

DETAILED DESCRIPTION

The subject matter described herein will now be discussed with reference to various example implementations. It would be appreciated these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Example Environment

Figure 1:
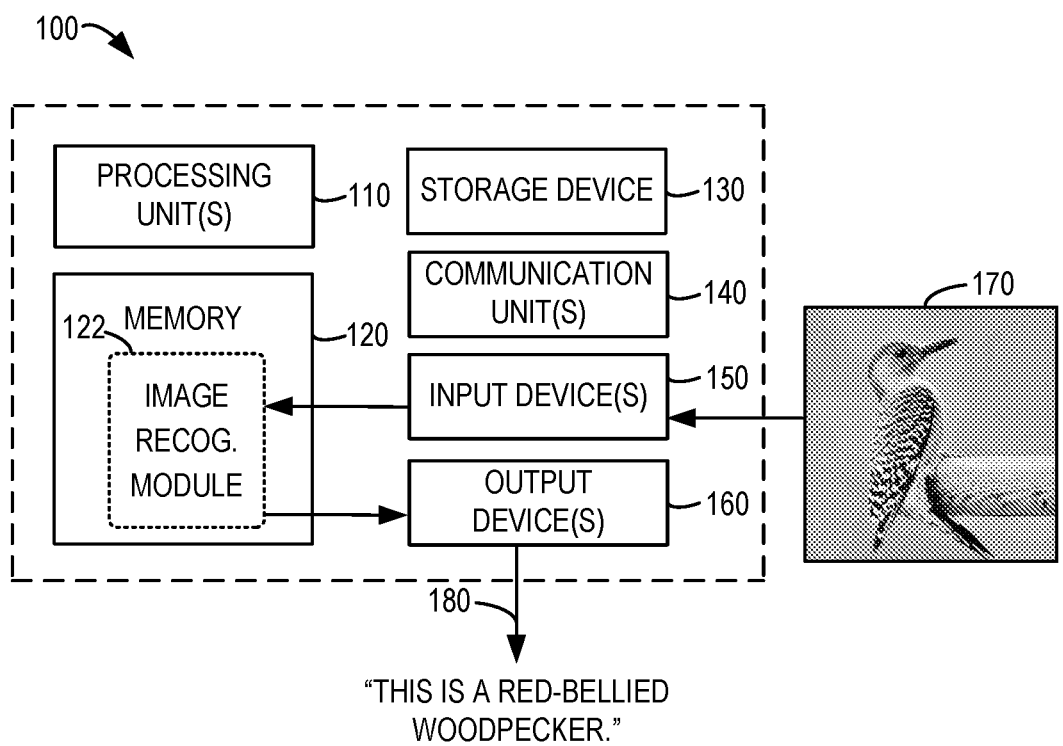
FIG. 1 is a block diagram of a computing device that can implement implementations of the subject matter described herein.

FIG. 1 is a block diagram illustrating a computing device 100 that can implement implementations of the subject matter described herein. It is to be understood that the computing device 100 as shown in FIG. 1 is only an example but will be considered as any limitation to the functions and scope of the implementations described herein. As shown in FIG. 1, the computing device 100 includes a computing device 100 in form of general-purpose computing device. Components of the computing device 100 may include, but are not limited to, a processor(s) or processing unit(s) 110, a memory 120, a storage device 130, a communication unit(s) 140, an input device(s) 150, and an output device(s) 160.

In some implementations, the computing device 100 can be implemented as any user terminal or service terminal with a computing capability. The service terminal may be a server, a large-scale computing device, and the like that is provided by service providers. The user terminal may for example be any type of mobile terminal, fixed terminal, or portable terminal, including a mobile telephone, station, unit, device, multimedia computer, multimedia tablet, Internet node, communicator, desk-top computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It can be appreciated that the computing device 100 can support any type of interface for a user (such as a "wearable" circuit).

The processing unit 110 may be a physical or virtual processor and can implement various processes according to programs stored in the memory 120. In a multi-processor system, a plurality of processing units execute computer executable instructions in parallel so as to improve the parallel processing capability of the computing device 100.

The processing unit 110 may also be referred to as a central processing unit (CPU), microprocessor, controller, and microcontroller.

The computing device 100 typically includes various computer storage medium. The medium can be any available medium that are accessible by the computing device 100, including but not limited to volatile and non-volatile medium, removable and non-removable medium. The memory 120 can be a volatile memory (e.g., a register, a cache, a random-access memory (RAM)), a non-volatile memory (e.g., read-only memory (ROM), an electrically erasable programmable read-only memory (EEPROM), a flash) or some combination thereof. The memory 120 can include an image recognition module 122 which is configured to perform functions of implementations of the subject matter described herein. The image recognition module 122 can be accessed and run by the processing unit 110 to implement the corresponding functions.

The storage device 130 may be a detachable or non-detachable medium and may include a machine-readable medium which is configured to store information and/or data and can be accessed in the computing device 100. The computing device 100 may further include additional detachable/non-detachable, volatile/non-volatile storage medium. Although not shown in FIG. 1, it is possible to provide a disk drive for reading from or writing into a detachable and non-volatile disk and a disc drive for reading from or writing to a detachable and non-volatile disk. In such cases, each drive may be connected to a bus (not shown) via one or more data medium interface.

The communication unit 140 communicates with a further computing device via the communication medium. In addition, the functions of the components of the computing device 100 may be implemented by a single computer cluster or multiple computing machines that can communicate via communication connections. Therefore, the computing device 100 can operate in a networked environment using a logic connection to one or more other servers, personal computers (PC) or a further general network node.

The input device 150 may include one or more of a variety of input devices, such as a mouse, a keyboard, a tracking ball, a voice-input device, and the like. The output device 160 may include one or more of a variety of output devices, such as a display, a loudspeaker, a printer, and the like. By means of the communication 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be executed by an input/output (I/O) interface (not shown).

Figure 2:
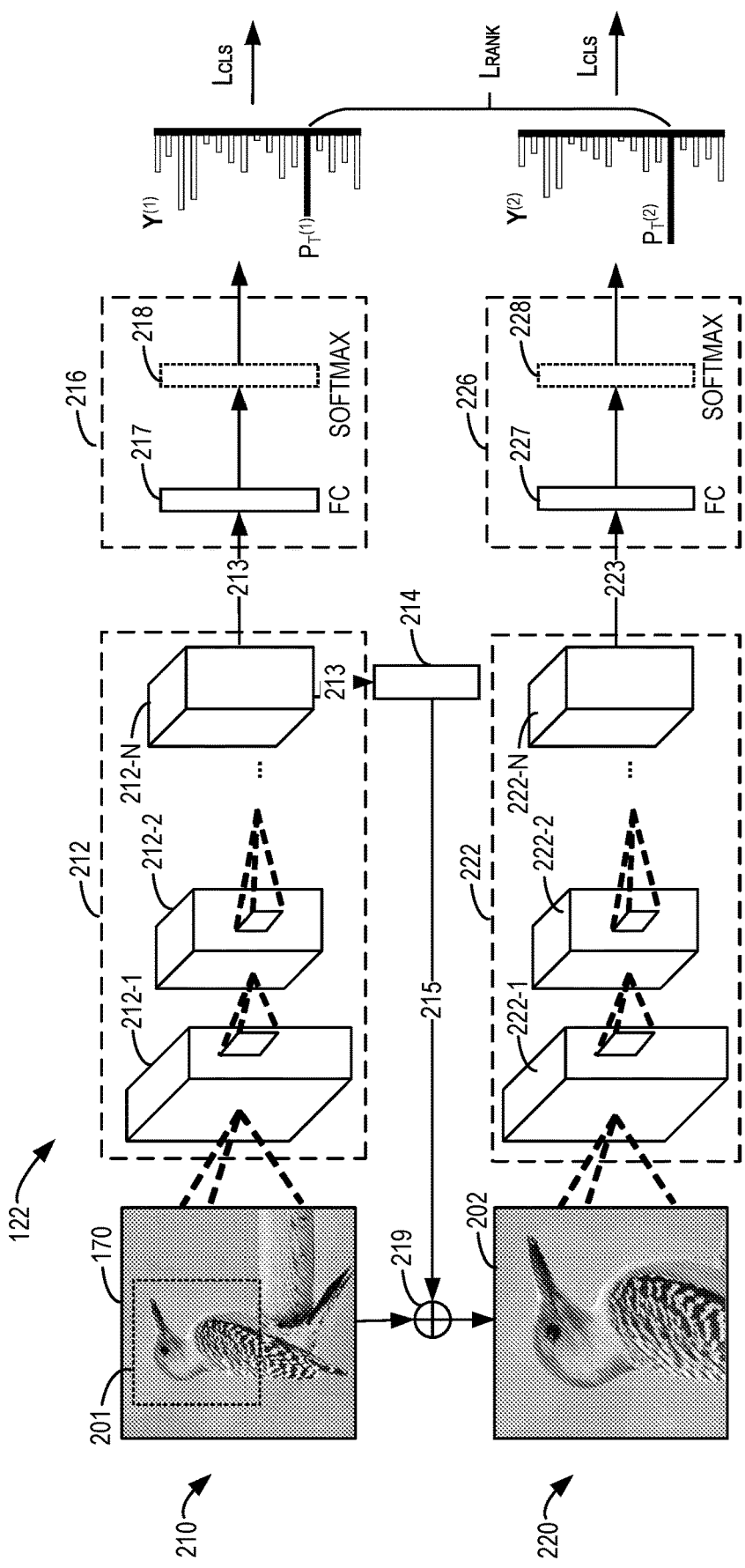
FIG. 2 is a block diagram of a system for image recognition in accordance with implementations of the subject matter described herein.
Figure 3:
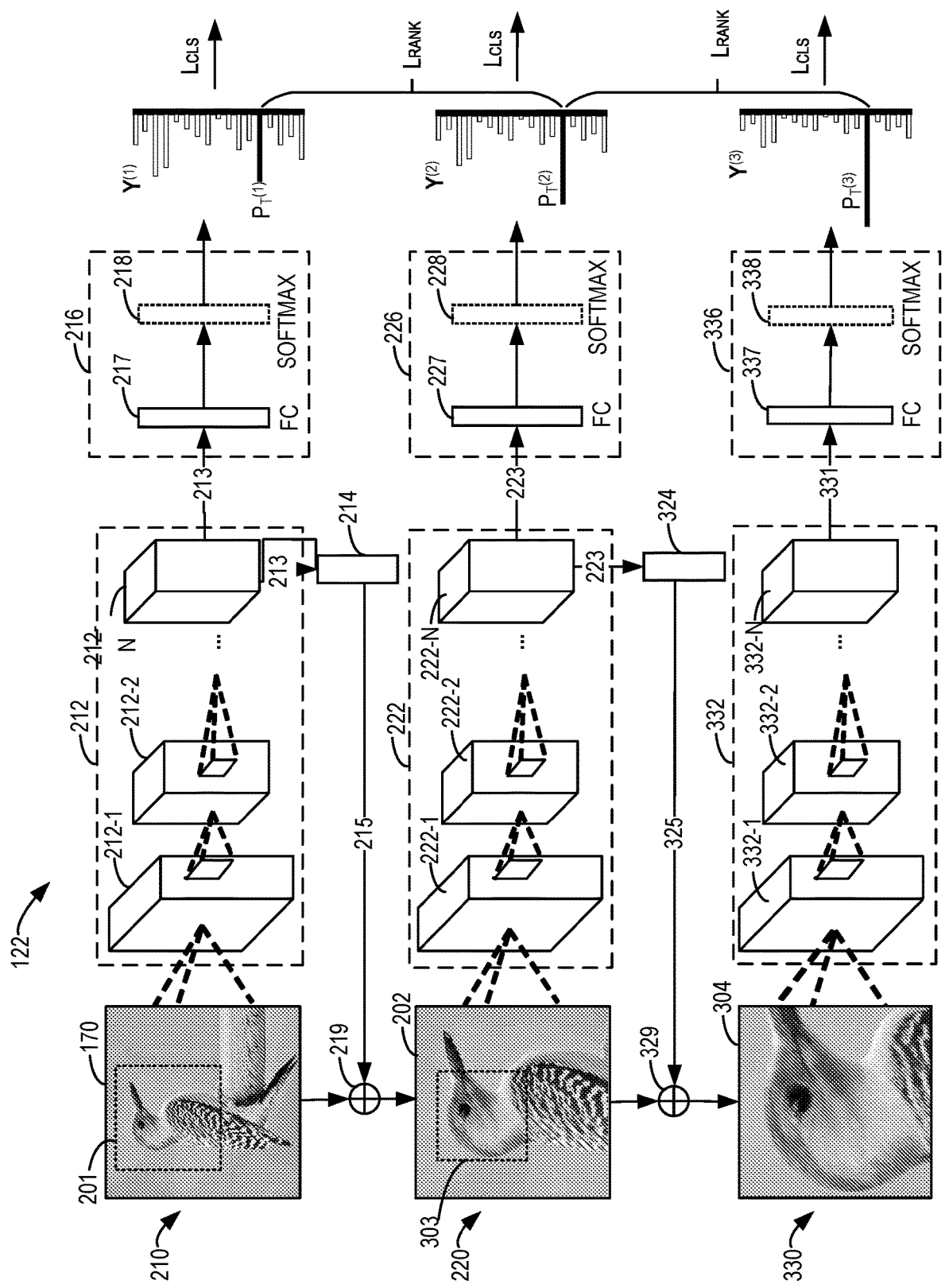
FIG. 3 is a block diagram of a system for image recognition in accordance with other implementations of the subject matter described herein.

The computing device 100 can be used to implement image recognition of implementations according to the subject matter described herein. Hence, the computing device 100 is sometimes referred to as an "image processing device 100." When implementing the image recognition, the computing device 100 can receive an image 170 via an input device 150. The processing unit 110 of the computing device 100 may recognize a category of an object included in the image 170 by running run the image recognition module 122, and output a recognizing result 180 via an output device 160. The recognizing result may indicate the recognized category of the object. It would be appreciated that the image 170 as shown in FIG. 1 and FIGS. 2 and 3 to be discussed below is only an example, and the image recognition may be implemented for any input image in other implementations depending on actual requirements.

In some applications, the task of the image recognition is to determine a fine-grained category of the object in the image 170. For example, in the example of FIG. 1, the recognizing result 180 of the image recognition module 122 may include the text of "This is a red-bellied woodpecker" to indicate a specific species of the bird included in the image 170. Such image recognition task is referred to as fine-grained image recognition. In comparison with image recognition of a general category (in which only a general category of "bird" is recognized), in the finely-grained image recognition, the main differences between the object of one category and the object of another category are determined as subtle visual differences of a certain region or regions of the object, rather than the visual differences of the overall features. For example, for different species of birds, the differences may lie in the colors and/or patterns of their necks, backs or tails, the shapes and/or colors of their beaks or claws, or the like. Such a portion that is applicable to determine a specific category of an object may be referred to as a discriminative portion of the object.

The challenges of fine-grained image recognition include localizing a discriminative portion(s) of an object of a particular fine-grained category and accurately characterizing the features of the discriminative portion(s). This process is related to two aspects, namely discriminative portion localization and fine-grained feature learning from those portions. With development of the image processing techniques, it has been found that the image recognition task can be effectively performed by various models, particularly by neural network-based models. A neural network recognition architecture based on an image region has been introduced in the existing fine-grained image recognition. This mainly includes the following two steps: first, analyzing one or more possible object regions in an image from convolutional responses of the neural network in an unsupervised fashion, or determining specific regions in the image by known bounding boxes or region annotations in a supervised fashion; then, extracting features from each of the regions and recognizing a specific category of the object based on these features.

Although the existing fine-grained image recognition can provide promising results for some objects in the fine-grained recognition tasks, further improvement for the recognition suffers from various limitations. For example, the regions learned by the existing unsupervised methods or the human-defined or annotated regions in the supervised method may not be optimal for the image classification. In addition, it may lead to low efficiency to manually define or annotate the specific regions for feature extraction. Further, although the neural network has a strong learning capability, subtle visual differences (i.e., fine-grained features) existed in smaller regions from similar fine-grained categories are still difficult to learn.

The inventors found though researches that discriminative portion detection and fine-grained feature learning are mutually correlated and thus can reinforce each other. In other words, accurate discriminative portion localization can promote learning fine-grained features, which in turn can further help to accurately localize the discriminative portions. In view of this, implementations of the subject matter described herein propose a novel solution for fine-grained image recognition. In this solution, an architecture of recurrent learning network is constructed for image recognition, without known bounding boxes/annotations of specific discriminative regions of an image.

Specifically, the constructed learning network architecture includes a plurality of learning networks in a stacked structure. Each of the learning network processes an image input at a different scale of a plurality of scales ranging from the full image to a fine-grained region. A learning network in the stacked structure is provided for extracting a global feature of the image and determining an attention region of the image based on the global feature, the attention region including a discriminative portion of an object in the image. A further learning network in the stacked structure is provided for extracting a local feature of the attention region determined by the preceding learning network. A category of the object in the image can be determined based on the local feature. In the solution of the implementations of the subject matter described herein, since the learning networks are stacked in a recurrent fashion, different learning networks may gradually focus on the attention region of a higher discrimination from the full image, and extract the features from a coarse scale to a fine scale for object recognition. Thus, the extraction of fine-grained features benefits from accurate localization of the discriminative portion of the object, and thus may promote the accurate recognition of the object category.

Various implementations of the subject matter described herein are further described below through specific examples. In the implementations of the subject matter described herein, a learning network may also be referred to as a "neural network" or "learning model." Hereinafter, the terms "learning model", "learning network", "neural network", "model", and "network" may be used interchangeably.

System Architecture and Work Principles

Reference is now made to FIG. 2, which is a block diagram illustrating a system for image recognition in accordance with some implementations of the subject matter described herein. The system may be considered as a neural network-based architecture and may be implemented at the image recognition module 122 of the computing device 100 in FIG. 1. As shown in FIG. 2, the system includes a plurality of stacked learning networks 210 and 220. The learning networks 210 and 220 may be implemented as one or more functional sub-modules in the image recognition module 122. For sake of differentiation herein, the learning network 210 may also be referred to as a first learning network, and the learning network 220 may also be referred to as a second learning network. The image recognition module 122 is configured to determine a category of an object in the image 170. The different learning networks 210 and 220 perform operations at different scales, where the learning network 210 focuses on a full-image scale of the image 170 while the learning network 220 focuses on a finer scale than the learning network 210. The image of the finer scale to be processed by the learning network 220 is dependent on the determination at the learning network 210. A specific structure of the stacked learning networks and the image recognition processing therein will be introduced below.

As shown in FIG. 2, the learning network 210 includes a sub-network 212 for extracting a feature 213 of the image 170. The sub-network 212 may also be referred to as a first sub-network or a feature extraction sub-network of the learning network 210. Since the sub-network 212 performs the feature extraction at a full-image scale, the feature 213 may be referred to as a global feature. The feature extraction sub-network 212 may extract one or more global features 213, and each global feature 213 may indicate partial feature information of the image 170, such as color, profile, edge, line, and the like of the object and/or the background in the image 170. In some implementations, the feature extraction sub-network 212 may extract one or more feature maps of the image 170 to characterize the respective global feature(s) 213.

The sub-network 212 may have a hierarchical structure and include one or more layers 212-1 through 212-N, where N is an integer greater than or equal to 1. In the hierarchical structure of the sub-network 212, an input of a preceding layer may be used as an input of a following layer for further processing, and the input of the first layer 212-1 is the image 170, while the output of the last layer 212-N is the global feature 213 of the image 170. Each layer of the sub-network 212 may be comprised of one or more neurons. In some implementations, a plurality of layers of a convolutional neural network (CNN) having an outstanding performance on image processing may be utilized to form the sub-network 212. In these implementations, a plurality of layers 212-1 through 212-N may include one or more convolutional layers for performing convolutional operations on the input. The plurality of layers 212-1 through 212-N may further include one or more activation layers for non-linear transformation (which consists of a non-linear activation function, e.g., a ReLU function) and/or one or more pooling layers. It would be appreciated that a number of layers of the sub-network 212, a number of neurons, and/or the layer configuration may be configured depending on actual requirement as long as the feature extraction can be accomplished.

The learning network 210 may further include a sub-network 214 for determining a region at a finer scale in the image 170 for the learning network 220. The region may be determined as a portion of the image that can facilitate the learning network 220 to recognize the category of the object. As such, this region may be referred to as an attention region which includes a discriminative portion of the object in the image 170. The sub-network 214 may be referred to as a visual attention sub-network that is based on the visual attention-based region, because the sub-network 214 is used to determine a more fine-grained region in the image 170 for other sub-networks 220, such that the other sub-networks can only focus on processing in a local region at a finer scale.

Specifically, the sub-network 214 may determine an attention region of the image 170 based on the global feature 213 extracted by the feature extraction sub-network 212. In the example of FIG. 2, the attention region may be determined as a region 201 in the image 170, which includes the upper body of a bird of a particular specie in the image 170 because the specific specie of bird can be recognized by the feather at the back neck of the bird. In some implementations, the sub-network 214 may include one or more layers and each layer includes one or more neurons. The input of the first layer of the sub-network 214 is the global feature 213, and the output of the last layer is a location parameter 215 that is used for identifying the attention region 201 in the image 170. Determination of the location parameter 215 by the sub-network 214 will be described in detail below.

The learning network 210 further includes a region extraction section 219 for extracting (or cropping) the attention region 201 from the image 170 based on the output of the sub-network 214 (e.g., the location parameter 215). In some implementations, the region extraction section 210 directly takes the attention region 201 in the image 170 based on the location parameters 215 as an input of the next learning network 220. In some other implementations, since the processing in the image region at a smaller size is probably inaccurate, the region extraction section 219 may also zoom in on the attention region 201 to obtain the zoomed-in attention region (or image) 202 as the input of the learning network 220. The region extraction section 219 may zoom in on the region 201 until it has a same size as or a similar size to that of the image 170, or any other sizes.

The learning network 220 performs its processing at the scale of the attention region 220. Specifically, the learning network 220 includes a sub-network 222 for extracting a feature 223 for the image 202 that is zoomed in from the attention regions 201. The sub-network 222 may also be referred to as a second sub-network or a feature extraction sub-network of the learning network 220. Since the sub-network 222 performs the feature extraction at a finer scale than the full-image scale, the extracted feature 223 may be referred to as a local feature or a first local feature. The feature extraction sub-network 222 may extract one or more local features 223, and each local feature 223 may indicate partial feature information indicative of the image 202, such as the local color, profile, edge, line and the like of a partial object and/or partial background in the image 202. In some implementations, the feature extraction sub-network 222 may extract one or more feature maps of the image 202 to characterize the respective local feature(s) 223.

In some implementations, the structure of the feature extraction sub-network 222 may be configured as identical or similar to that of the feature extraction network 212. For example, the feature extraction sub-network 222 may be comprised of a CNN network including one or more convolutional layers, activation layers, and/or pooling layers 222-1 through 222-N for extracting the feature maps, where N is an integer being greater than or equal to 1. It would be appreciated that although the feature extraction sub-network 222 is shown as including the same number of layers N as the extraction sub-network 212, in other implementations, the number of layers in the sub-network 222, the number of neurons in a layer, and/or the layer configuration may be different from those in the sub-network 212.

The local feature 223 extracted by the feature extraction sub-network 222 characterizes fine-grained feature information of the discriminative portion of the object in the image 170, and therefore can be used to determine a category of the object in the image 170. In some implementations, the learning network 220 includes a sub-network 226 for determining the category of the object in the image 170 based on the local feature 223. The sub-network 226 may also be referred to as a classification sub-network of the learning network 220. Various classification neural network structures may be utilized to configure the sub-network 226. In some implementations, the sub-network 226 may include one or more fully-connected (FC) layers 227 for processing the local feature 223. In some examples, the fc layer 227 is provided for mapping the local feature 223 to a feature vector which includes one or more elements corresponding to one or more corresponding categories. The sub-network 26 further includes a multinomial logistic regression (also referred to as "Softmax") layer 228 for determining, based on the output of the fc layer 227, which one of the predetermined categories the object in the image 170 belongs to. The Softmax layer 228 may convert the output of the FC layer 227 into respective probabilities corresponding to the predetermined categories, and the category corresponding to the maximum probability is the category of the current input image 170. Each probability may be indicated by a numerical value ranged from 0 to 1, or by 0 or 1. The category of the recognized object may be the output of the image recognition module 122 (e.g., the output 180 in FIG. 1). The output 180 may indicate the category of the recognized object in form of words, image, voice, video, or the like, or a combination thereof.

Generally speaking, the learning network architecture in the image recognition module 122 may be configured and trained for determining whether an input image belongs to one of a plurality of predetermined categories. In a case of fine-grained image recognition, the predetermined categories may include a plurality of fine-grained categories in a general category. For example, the plurality of predetermined categories may be a plurality of specific species of a certain living creature, brands or models of some articles, or medical cell classification (a normal cell or a cancer cell), and the like. In some implementations, the plurality of predetermined categories include a negative category indicating that the object in the current input image does not belong to any fine-grained categories. In the example of FIG. 2, the image recognition module 122 may be trained to determine whether an object in an input image belongs to one of the plurality of species of birds. It would be appreciated that the image recognition module 122 may be trained as recognizing a plurality of more fine-grained categories in a fine-grained category.

In some implementations, since the global feature 213 extracted at the full-image scale may characterize the global feature information of the image 170, and thus may be combined with the local feature 223 to determine the category of the object in the image 170. In some implementations, the learning network 210 may include a classification sub-network 216 that includes the FC layer 217 for comprehensive processing of the global feature 213. The output of the FC layer 217 is concatenated to the output of the FC layer 227 of the classification sub-network 226 of the learning network 220 and is input to a further Softmax layer (not shown) to determine the category of the object in the image 170. The Softmax layer is also referred to as a fully-connected fusion layer having a Softmax function for the classification task. In some implementations, the outputs of the FC layers 217 and 227 may be referred to as feature descriptors at different scales, and these feature descriptors may be separately normalized before being input to the Softmax layers.

It can be seen that FIG. 2 shows that the classification sub-network 216 of the learning network 210 also includes a Softmax layer 218. It would be understood from the discussion below that the Softmax layer 218 is used in a training process of the learning network and may be omitted in the object recognition process based on the combined features.

In the implementation of FIG. 2, the feature extracted by the learning network 210 is used to accurately locate the attention region, and the accurate localizing of the attention region may improve extraction of the fine-grained feature of the attention region in the next learning network 220. Accordingly, the mutual reinforcing manner simultaneously ensures accurate detection of the discriminative portion and effective extraction of the fine-grained feature, thereby improving recognition of the image category.

Extension of System Architecture

The example of FIG. 2 illustrates a stacked structure including two learning networks 210 and 220 for the processing at two scales of the image 170. In further implementations, the image recognition module 122 may be configured to include one or more additional learning networks for localizing finer discriminative portions of the object in the image 170 and extracting finer features for recognizing the category of the object. FIG. 3 illustrates a further extension on the system architecture of FIG. 2. In the example of FIG. 3, in addition to the learning networks 210 and 220, the image recognition module 122 further includes a learning network 330 (also referred to as a third learning network). In addition, the learning network 220 also includes a sub-network 324 for determining a attention region at a finer scale for the learning network 330. The sub-network 324 may also be referred to as a second sub-network or a visual attention sub-network of the learning network 220.

The sub-network 324 has a similar function to that of the sub-network 214 and is configured to determine a further attention region of the image 170 based on the local feature 223 of the sub-network 222. The determined attention region is used as a basis for the processing in the next learning network 330. Since the input of the learning network 220 is the attention region 201 in the image 170 or the zoomed-in image 202 of the attention region 201, the further attention region determined by the sub-network 214 is included in the attention region 201 or the zoomed-in image 202. The attention region may be determined in such as way that the learning network 330 focuses on a smaller portion that contributes to recognize the category of the object in the image 170, and thus may include a discriminative portion of the object in the image 170. In the example of FIG. 3, the attention region determined by the sub-network 324 may be a region 303 in the image 202, which includes a head portion in the upper body of the bird in the image 202, because the specific species of the bird can be recognized through the feather at the back neck of the bird of this species.

In some implementations, the configuration of the sub-network 324 may be the same to or similar as that of the sub-network 214 in the learning network 210. For example, the sub-network 324 may include one or more layers, and each layer includes one or more neurons. The input of the first layer of the sub-network 324 is the local feature 223, and the output of the last layer is a location parameter 325 for identifying the attention region 303 in the image 202. The determination of the location parameters 325 by the sub-network 324 will be described in detail below In order to crop the attention region 303 from the image 202, the learning network 220 further includes a region extraction section 329 for extracting the attention region 303 from the image 202 based on the output (e.g., the location parameter 325) of the sub-network 324. In some implementations, the region extraction section 329 directly extracts the attention region 303 as an input of the next learning network 330. In some other implementations, since the processing in the image region at a smaller size is probably inaccurate, the region extraction section 329 may zoom in on the attention region 303 to obtain the zoomed-in attention region (or image) 304 as the input of the learning network 330. The region extraction section 329 may zoom in on the region 303 until it has a same size or a similar size to that of the image 170 or 220, or any other sizes.

The learning network 330 performs the feature extraction at the scale of the attention region 303. Specifically, the learning network 330 includes a sub-network 332 for extracting a feature 333 of the image 304. The sub-network 332 may also be referred to as a second sub-network or a feature extraction sub-network 332 of the learning network 330. Since the sub-network 332 performs the feature extraction at a finer scale than that of the region 201, the extracted feature 333 may be referred to as a local feature or a second local feature. The feature extraction of the sub-network 332 may be similar to that of the sub-network 212 or 222. Since the image to be processed is at a finer scale, each local feature 333 may indicate feature information, such as the local color, profile, edge, line and the like of a smaller portion of the object and/or smaller background of the image 170. The structure of the feature extraction sub-network 332 may be configured with a structure identical to, similar to or entirely different from the structure of the feature extraction network 212 or 222.

The local feature 333 extracted by the feature extraction sub-network 332 characterizes finer feature information of the discriminative portion of the object in the image 170, and thus can be used to determine the category of the object in the image 170. In some implementations, the learning network 333 includes a sub-network 336 for determining the category of the object in the image 170 based on the local feature 333. The sub-network 336 may be referred to as a classification sub-network of the learning network 330, which has a structure similar to that of the classification sub-network 216 or 226. As shown in FIG. 3, the sub-network 336 may include one or more FC layers 337 and a Softmax layer 338 for determining, based on the local feature 333, which one of the predetermined categories the object in the image 170 belongs to.

In some implementations, as discussed above about FIG. 2, in the image recognition module 122 including three stacked learning networks, in order to take the features of different scales into account, the local feature 333 may be combined with the global feature 213 and/or local feature 223 to determine the category of the object in the image 170. The classification recognition based on the combined features of the different scales may be similar to the manner described with reference to FIG. 2, which is omitted herein.

It would be appreciated from the below discussion that, in the example of FIG. 3, illustration of the Softmax layers 218 and 228 in the classification sub-networks 216 and 226 and the Softmax layer 338 in the case of combining features of the scales are applied in the training process of the following learning network, and may be omitted in the object recognition process that is based on the combined features.

The stacked structure of learning networks of different scales is described above with reference to FIG. 3. In this structure, the learning network at the preceding layer may provide accurate attention region localization such that the learning network at the next layer can effectively extract the fine-grained feature from the accurately located region. Moreover, the extracted fine-grained feature may further locate the more accurate and fine-grained attention region. Thus, it is possible to further improve the classification recognition of the image through recurrent detection of accurate discriminative regions and effective extraction of the fine-grained features, which will reinforce each other.

Although FIG. 3 illustrates the stacking of learning networks of three scales, more learning networks may be stacked in a similar manner in other implementations, such that the additional learning networks can perform feature extraction and object classification on basis of a attention region at a finer scale. For example, if a category of the object in the image is recognized from more fine-grained categories, the differences of objects in the fine-grained categories are determined by visual differences of smaller regions, or if the original size of the image is greater (e.g., the medical image), a stacked structure of more learning networks may be configured.

Training of Learning Networks

As described above, the category recognition is achieved for the image in the architecture in FIGS. 2 and 3. In order to enable the image recognition module 122 to accomplish the image recognition in the architecture of FIGS. 2 and 3, after configuring the structure of the learning network in FIG. 2 or 3, it is required to train the learning networks, such that each sub-network of the configured learning network can learn the capability of performing its corresponding processing task.

Typically, the processing at each layer of the learning network is to process an input using a predetermined function to generate an output. Accordingly, in the training process of the learning network, training data are used to update or optimize the respective parameters in the function of each layer. When the update of the parameters reaches a convergence target, the training process of the learning network is completed. The convergence target may be determined by setting a loss function related with the parameters to be determined. In the task of image recognition, the training data may include one or more images (also referred to as training images). The category of the object in the training image is known for supervision. In the training process, each image may be input to the configured learning network structure and may update the parameters of the learning network by a training method of backward propagation.

In some implementations, depending on the categories of objects that are desired to be differentiated, the training images may include one or more images including an object of the corresponding category. In the example of fine-grained image recognition, a plurality of categories may include a plurality of fine-grained categories in a certain general category of the object. For example, if the learning network structure in FIG. 2 or 3 is to be trained as being capable of recognizing a plurality of species of birds, the training images may include images of different species of birds.

As described above with reference to FIG. 2 and/or FIG. 3, each sub-network of the learning network in the image recognition module 122 is to be trained to enable the sub-network to implement the corresponding processing. In the structure including the learning networks 210 and 220, there are two tasks to be implemented in the learning network 210 or 220, including extracting the feature of the input image (for the sub-networks 212 and 222) and determining the attention region for the learning network at a next layer (for the sub-networks 214 and 324). In the training process, different types of supervision are provided for the two tasks, respectively.

For the feature extraction task, in order to enable the extracted feature to represent the input image more accurately, training supervision is related with the classification based on the extracted feature. Specifically, for the learning network 210, the feature extraction sub-network 212 is to be updated to increase a probability of the object in the training image belonging to its correct category, which probability is determined based on the global feature extracted from the training image. For the learning network 220 and the learning network 330 in FIG. 3, the feature extraction sub-networks 222 and 332 are updated respectively to increase probabilities of the object in the training image belonging to its correct category, respectively, which probabilities are respectively determined based on the local features extracted from the corresponding attention regions. The attention regions for extracting the local features by the feature extraction sub-networks 222 and 332 are respectively determined by the visual attention sub-networks 214 and 324 of the learning networks 210 and 220 at the preceding layers.

In the example of training the image recognition module 122 in FIG. 2 or 3 to recognize a plurality of species of birds, the training supervision for the feature extraction sub-networks 212, 222 or 332 is that, after the parameters of a feature extraction sub-network are updated, the global feature or local feature extracted by the updated feature extraction sub-network can be used to determining the category of the object in the image more accurately.

In this condition of the training supervision, a respective classification sub-network is provided in each learning network 210, 220, or 330, i.e., the classification sub-network 216, 226, or 336 as shown in FIGS. 2 and 3. These classification sub-networks are respectively provided for determining the category of the object in the training image in the training process based on the features extracted by the sub-networks 212, 222, and 332. As mentioned above, the classification sub-networks 216, 226, and 336 may be configured with various classification neural network structures. FIGS. 2 and 3 illustrate a kind of structure for the classification sub-networks 216, 226 and 336, which include the FC layers 217, 227 and 337, and the Softmax layers 218, 228 and 338. The Softmax layer 218, 228 or 338 of each classification sub-network outputs an indication indicative to which one of the categories the object in the current input image belongs. For example, the output of the Softmax layer 218, 228 or 338 may include a probability distribution which contains respective probabilities corresponding to the predetermined categories.

For the task of determining an attention region, in order to locate a more accurate attention region for the learning network at the next layer, the training supervision is related with the increase of the probability between two layers of learning networks. To be specific, regarding the learning networks 210 and 220, the visual attention sub-network 214 is to be updated such that: as comparing with the probability of the object in the training image belonging to its known category (also referred to as "a first probability") that is determined by the learning network 210, the probability determined by the learning network 220 (also referred to as "a second probability") is higher. In other words, the visual attention sub-network 214 is gradually updated to be capable of detecting a more accurate attention region, thereby ensuring that the learning network at the next layer can recognize the category of the object in the image more accurately on the basis of the attention region. In the example of FIG. 3, the visual attention sub-network 324 may be updated based on a similar training supervision.

For better understanding the training of the learning networks in the stacked structure, representations of various processing in each learning network will be discussed below, the loss function for training will be further constructed, and the training process based on the loss function will be discussed as well.

Feature-Based Processing

Given an input image (e.g. an image 170, 202 or 204) X to each learning network (including the learning network 210, 220 or possible 330), the image X is input to the feature extraction sub-network (the sub-network 212, 222 or possible 332) of the learning network, the extracted feature may be represented by $W_c*X$ (corresponding to a global feature or a local feature), where * represents the processing operations of each layer in the feature extraction sub-network (including convolution, pooling and/or activation operations), and $W_c$ represents the overall parameters of the feature extraction sub-network. The extracted feature $W_c*X$ may be used in the learning network for determining a classification result and for determining a attention region for a learning network at the next layer.

In the process of determining a classification result, the feature $W_c*X$ is used to determine a respective probability of the object in the input image belonging to a predetermined category. If the image recognition module 122 is to be trained as being capable of determining objects of a plurality of categories, the extracted feature may be applied to generate a probability distribution (represented as p) indicative of the respective probabilities that the object in the image belong to the respective predetermined categories, which may be represented as follows:

$$p(X)=f(X_c*X), \quad (1)$$

where $f(\cdot)$ represents the processing operations in the classification sub-network (the sub-network 216, 226 or possible 336) of the learning network, including an operation that the FC layer maps the feature to elements corresponding to the plurality of predetermined categories and an operation that the Softmax layer converts the feature vector to the probabilities corresponding to the predetermined categories.

Except for determining the probability distribution in the predetermined category, in some learning networks (e.g., 210 and 220), the extracted feature $W_c*X$ may be used to predict an attention region by the visual attention sub-network of the learning network at the next layer. In some implementations, localizing the attention region at a respective scale may be represented as determining the location parameter of the attention region. For example, the shape of the attention region may be predefined as a square, three location parameters may therefore be determined from the extracted feature for identifying the square attention region, and this process may be represented as follows:

$$[t_x, t_y, t_l] = g(W_c*X), \quad (2)$$

where $t_x$, $t_y$ represent coordinates of a center point in the square attention region in the x axis and y axis, respectively, $t_l$ is a side length of the square attention region, and $g(\cdot)$ is an operation on the input feature $W_c*X$ in the respective visual attention sub-network (the sub-network 214 or 324). The coordinate parameters $t_x$, $t_y$ identify the coordinates relative to the image from which the attention region is identified.

It would be appreciated that the above Equation (2) only gives an example of the location parameter of the attention region. In other cases, the visual attention sub-network may be designed as determining other location parameters based on the features to identify the attention region of a particular shape. For example, regarding the square or rectangular attention region, the coordinates of four vertices of the square or rectangle may be determined as the location parameters; and regarding a circle region, a coordinate of the circle center and a radius or diameter of the circle may be used as the location parameters. Of course, attention regions in other shapes may also be defined, and the visual attention sub-network may be designed to determine, based on the input features, the location parameters that can be used for determining the respective attention regions. The square attention region and the above location parameters $t_x$, $t_y$ and $t_l$ are taken as an example in below discussion.

Localizing and Zooming-In of Attention Region

In the learning networks 210 and 220, the location parameters for the attention regions determined by the respective visual attention sub-networks (the sub-networks 214 and 324) may be used to crop the attention region from the images at an upper scale to serve as a basis of processing in the learning network at the next layer. The discussion below is about how an attention region is localized and zoomed-in based on the location parameter.

In some implementations, in order to ensure that the visual attention sub-network is updated or optimized in the training process, the attention region is crop on the basis that a function related with location parameter of the attention region is used as a region mask based on the visual attention sub-network. For example, the function may be a two-dimensional rectangular function. The region mask may select the most meaningful region in forward propagation and is optimized in backward propagation due to the property of a continuous function.

Assuming that the upper left corner of the input image in each learning network (the learning network 210 or 220) is an origin, and the x axis and they axis are respectively defined as being from left to right and from top to bottom relative to the origin. Coordinates of a point at the upper left corner (represented as "tl") and a point at the lower right corner (represented as "br") of the attention region to be identified may be determined based on the location parameters, respectively as follows:

$$t_{x(tl)}=t_x-t_l, \; t_{y(tl)}=t_y-t_l,$$

$$t_{x(br)}=t_x+t_l, \; t_{y(br)}=t_y-t_l. \quad (3)$$

where $t_{x(tl)}$ and $t_{y(tl)}$ represent coordinate values of the point at the upper left corner of the attention region in the x axis and the y axis, respectively, and $t_{x(br)}$ and $t_{y(br)}$ are coordinate values of the point at the lower right corner of the attention region in the x axis and the y axis, respectively.

Based on the above Equation (3), the operation of cropping the attention region from the input image at a larger scale may be represented as element-wise multiplication between the input image and the region mask of the visual attention sub-network. In a case of cropping a attention region from the input image X of the learning network 210, an identifier of the attention region is represented as follows:

$$X^{att}=X\odot M(t_x,t_y,t_l), \quad (4)$$

where $\odot$ represents pixel-wise multiplication, $X^{att}$ is an attention region, and $M(\cdot)$ identifies a region mask determined based on the location parameter of the attention region which may be embodied as a function related with the location parameter of the attention region. In one example, $M(\cdot)$ may be formed as follows:

$$M(\cdot)=[h(x-t_{x(tl)})-h(x-t_{x(br)})]$$

$$\cdot[h(y-t_{y(tl)})-h(y-t_{y(br)})], \quad (5)$$

where $h(\cdot)$ is a logic function. In one example, the logic function $h(\cdot)$ may be formed as:

$$h(x)=1/\{1+\exp^{-kx}\}. \quad (6)$$

Theoretically, if the index k is sufficiently great, the logic function $h(\cdot)$ may be considered as a jump function, and the two-dimensional rectangular function (i.e., $M(\cdot)$ is 1 in a single region (the x-dimensional range from $t_{x(tl)}$ to $t_{x(br)}$ but is 0 in other ranges along the x-dimension and the y-dimension.

The above Equation (4) gives an operation that the attention region is identified from the original input image X in the learning network 210. For the learning network 220, the related attention region may be identified from the input image at a second scale in a similar manner.

The advantages of identifying the attention region using a function based on the location parameter (such as a two-dimensional rectangular function) lie in the following: first, the rectangular function may be similar to the cropping operation of the region as much as possible to select a most meaningful region from the image; and second, the function based on the location parameter construct an analysis identifier between the attention region and the location parameters (i.e., $\{t_x, t_y, t_l\}$), which is helpful to optimize these location parameters in the backward propagation in the training process.

Although the attention region has been located, as mentioned above, it is sometimes probably difficult to extract an effective feature representation in a highly localized region. Therefore, the attention region may be zoomed-in. In some implementations, the attention regions determined by one or more learning networks (the learning network(s) 210 and/or 220) may be zoomed-in adaptively. As an example, the attention region may be zoomed-in using a bilinear interpolation. For instance, through the linear mapping, the most closest four inputs in the attention region $X^{att}$ may be used to calculate a value of a pixel point of the zoomed-in attention region (represented as "$X^{amp}$"). In one example, zooming-int based on the bilinear interpolation may be represented as follows:

$$X_{(i,j)}^{amp} = \sum_{\alpha,\beta=0}^{1} |1-\alpha-\{i/\lambda\}||1-\beta-\{j/\lambda\}|X_{(m,n)}^{att}, \quad (7)$$

where $m=[i/\lambda]+\alpha, n=[j/\lambda]+\beta$, $\lambda$ is an upper sampling factor which is a result of dividing the side length $t_l$ of the square attention region with the scale of the zoomed-in attention region $X^{amp}$. In the equation (7), $[\cdot]$ and $\{\cdot\}$ are rounding the integral part and rounding the fraction part, respectively.

It is to be understood that the above only describes localizing and zooming-in of the attention region with reference to the example in which the coordinates of a center point of the square attention region and the side length act as the location parameters. In examples in which other location parameters define the attention regions in other shapes, the attention regions determined by the visual attention sub-networks 214 and 324 of the learning networks 210 and 220 may be localized and zoomed-in in a similar or different manner.

Loss Function of Learning Network

In the image recognition module 122 including a plurality of stacked learning networks, such as in the example in FIG. 2 or 3, each training image is input to the learning network 210, and the probability distribution in a plurality of predetermined categories is determined by the feature extraction sub-network 212 and the classification sub-network 216. The attention region determined by the sub-network 214 of the learning network 210 may be localized and zoomed-in, so as to be used as an input of the learning network 220 at the next layer, and the feature extraction sub-network 222 and the classification sub-network 226 of the learning network 220 may determine likewise the probability distribution of objects in the current training image in the multiple categories. The subsequent learning network, such as the learning network 330, may obtain likewise the input and determine the result of the probability distribution.

As shown in FIGS. 2 and 3, it is assumed that the probability distribution determined by each learning network is represented as $Y^{(s)}$, where the range of s may be set from 1 to the total number of the learning networks in the stacked structure (it is 2 in the example of FIGS. 2, and 3 in the example of FIG. 3), and the value of s corresponding to the learning network at the lower layer is greater. The probability distribution $Y^{(s)}$ of each learning network includes respective elements indicative of probabilities corresponding to the respective categories among the plurality of predetermined categories. It is assumed that the element $P_t^{(s)}$ in the probability distribution $Y^{(s)}$ indicates a probability of a correct category of the object in the current input image.

As mentioned above, the learning networks 210, 220, and possible 330, the training supervision for the feature extraction sub-network is to continuously increase, based on the extracted feature, the probability that the object in the input training image belongs to its correct category (i.e., increasing the probability $p_t^{(s)}$), and the training supervision for the visual attention sub-network is that the determined attention region enables the probability determined by the learning network at the next layer to be higher than the one determined by the preceding layer (i.e., ensuring that the probability $p_t^{(s+1)}$ is greater than $p_t^{(s)}$). For example, in the example of FIG. 2 or 3, the training process allows continuously increasing the probabilities $P_t^{(1)}$, $P_t^{(2)}$ and $P_t^{(3)}$ of the correct categories of the objects in the training image (e.g. the image 170) in the probability distributions $Y^{(1)}$, $Y^{(2)}$ and $Y^{(3)}$ output by the learning networks 210, 220, and possible 330, respectively. In addition, the training process also enables the probability $P_t^{(2)}$ the learning networks 210 and 220 to be higher than $P_t^{(1)}$, and the probability $P_t^{(3)}$ between the learning networks 220 and 330 to be higher than $P_t^{(2)}$.

A loss function for training the learning network may be construed based on the above two types of training supervision. In some implementations, in the structure of FIG. 3, for a given training image X, the loss function may be defined as follows:

$$L(X) = \sum_{s=1}^{3} \{L_{cls}(Y^{(s)}, Y^*)\} + \sum_{s=1}^{2} \{L_{rank}(p_t^{(s)}, p_t^{(s+1)})\}, \quad (8)$$

where s represents the corresponding learning network, $Y^{(s)}$ and $Y^*$ represent a probability distribution and an actual probability distribution determined by the learning network, respectively, and $p_t^{(s)}$ and $p_t^{(s+1)}$ each are a probability of the object belonging to the correct category that is determined by the current learning network s, and a probability determined by the learning network s+1 at the next layer. Regarding an image X including an object of a category t, in the actual probability distribution $Y^*$, the probability corresponding to the category t is the highest one or is equal to 1, while the probabilities corresponding to other categories are lower or 0. $L_{cls}$ represents a classification loss function for supervision related with the feature extraction. $L_{rank}$ is a ranking loss function for supervision related with localizing of the attention region because this supervision requires that the probability of the learning network at the next layer to be higher than that at the preceding layer.

The classification loss function $L_{cls}$ ensures that after each learning network is updated, the probability distribution determined based on the extracted feature can be optimized such that the output $Y^{(s)}$ is optimized as matching with the actual probability distribution $Y^*$. The classification loss function $L_{cls}$ may be provided for optimizing the parameters of the feature extraction sub-networks and classification sub-networks (e.g., the sub-networks 212, 222, 332, as well as 216, 226 and 336) of each learning network. The ranking loss function $L_{rank}$ is used to ensure that the probability of the current training object in the correct category t is increased layer by layer. Specifically, the ranking loss function $L_{rank}$ may be represented as follows:

$$L_{rank}(p_t^{(s)}, p_t^{(s+1)}) = \max\{0, p_t^{(s)} - p_t^{(s+1)} + \text{margin}\}. \quad (9)$$

where margin represents an increase amplitude from the probability $p_t^{(s)}$ determined by the learning network s to the probability $p_t^{(s+1)}$ determined by the learning network s+1. margin may be predetermined with a fixed value ranged from 0 to 1. From the Equation (9), it can be determined that the ranking loss function $L_{rank}$ may guarantee $p_t^{(s+1)} > p_t^{(s)} +$ margin. The ranking loss function $L_{rank}$ may be provided for optimizing the parameters of the visual attention sub-networks (the sub-networks 214 and 324) in the learning network. Accordingly, through the design of the ranking loss function $L_{rank}$, the sub-networks 214 and 324 may be optimized to gradually localize a more accurate attention region with reference to the extracted feature.

Training Strategy For Learning Network

Based on the loss function, various training means may be used to update the parameters of each sub-network as given in FIG. 2 or 3. The parameters in each sub-network of the learning network may be initialized randomly. In some other implementations, the pre-trained feature extraction sub-network and/or classification sub-network may be obtained as an initial feature extraction sub-network and/or classification sub-network of the learning network(s) 210, 220 and/or 330. The pre-trained feature extraction sub-network and classification sub-network are trained on the basis of further training data (including the training images and information indicative of categories of the objects in the training images). For example, other trained separate classification neural networks may be used as the initial feature extraction sub-networks and/or classification sub-networks of the learning network(s) 210, 220 and 330, as the classification neural network typically includes a feature extraction section and a classification section for determining the classification result.

Regarding the visual attention sub-networks (the sub-networks 214 and 324) in the learning network, an initial location parameter of an attention region may be set such that the learning network at the next layer can obtain a respective image region for processing. In the implementation in which the attention region is in a square shape, for the visual attention network 214, the side length (i.e., the parameter $t_l$) in the location parameters (represented as $t_x$, $t_y$, $t_l$) of the attention region may be initialized as a half or other percentage of the side length of the original image. The initial location of the center point of the attention region may be localized by determining a region having a highest response value from the feature map output by the respective feature extraction sub-network 212. The initial location parameter of the visual attention sub-network 324 may be determined likewise. The initial location parameters may be used to pre-train the respective sub-networks 214 and 324. Specifically, in the pre-training process, the global feature or local feature determined by the initialized feature extraction sub-network may be transformed into the location parameters $\{t_x, t_y, t_l\}$ to obtain the initial parameters of the sub-networks 214 and 324.

After the parameters of each sub-network are initialized, the learning network may be optimized based on the loss function. Since the feature extraction network and the classification network are subjected to different types of training supervision than the visual attention sub-networks do, they may be updated alternately. In particular, in one example, the parameters of the visual attention sub-network 214 (and 324) may be firstly maintained unchanged, and then the feature extraction sub-networks 212, 222 (and 332) and the classification sub-networks 216, 226 (and 336) in the learning network may be updated based on the loss function $L_{cls}$. Subsequently, the updated parameters of each feature extraction sub-network and classification sub-network remain unchanged, the visual attention sub-network(s) 214 (and 324) is updated based on the ranking function $L_{rank}$. In a further example, after the initialization, in a case that the parameters of the feature extraction sub-network and the classification sub-network are first maintained as unchanged, the visual attention sub-networks may be updated; and the feature extraction sub-network and the classification sub-network are then updated with the updated visual attention sub-network fixed. The updating processes of the two sections may be iterative until the loss functions $L_{cls}$ and $L_{rank}$ are not changed any more. In each iteration, one or more training images may be used to update the respective sub-network of the learning network.

In some implementations, in each learning network 210 or 220, the location parameter $t_l$ determined by the visual attention sub-network 214 or 324 may be limited as not lower than a certain size (for example, not lower than one-third of the input image at the preceding layer, or not lower than one-third of the location parameter $t_l$ of the attention region determined by the preceding layer), so as to prevent the location parameter $t_l$ from being determined as extremely small.

In the above training process, the attention region localization and the fine-grained classification in the learning network may be optimized in a mutual reinforcing manner. After being trained, the parameters of each learning network may be determined and then used to recognize a fine-grained category of an object in an input image. In some implementations, the Softmax layer(s) 218, 228, and/or 338 in each of the trained classification sub-network(s) 216, 226 and/or 336 may not output the probability of the category of the object during the operation process. As discussed above, the feature extracted by each learning network 210, 220 and/or 330 may be concatenated for determining the classification result after being passed through the FC layer(s) 217, 227 and/or 337. The concatenated features may be input into a further Softmax layer so as to produce the final result. The parameters of this Softmax layer may also be determined by way of training.

The training process of the learning network has been described above with reference to the structure in FIG. 2 and FIG. 3. If there are more learning networks stacked in a similar manner, the training process may be similarly utilized to determine the parameters of the learning network, such that the learning network can learn a capability of recognizing more fine-grained categories.

Example Processes

Figure 4:
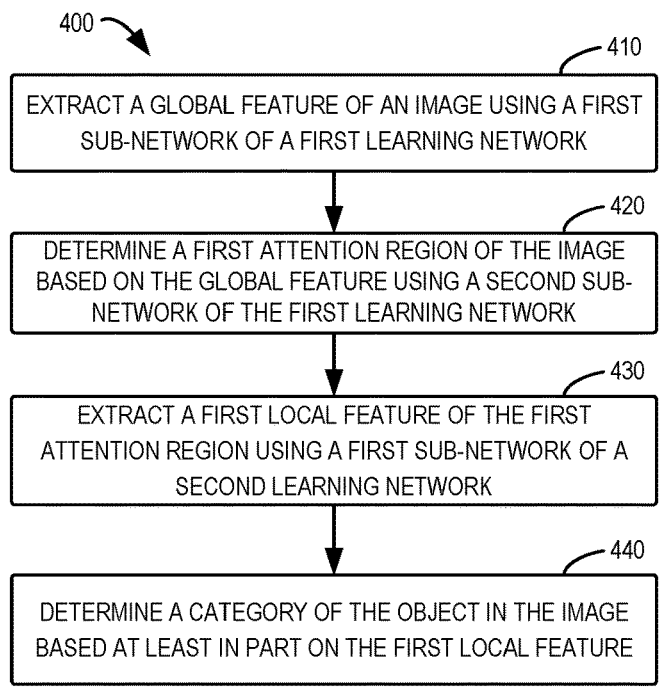
FIG. 4 is a flowchart of a process for image recognition in accordance with implementations of the subject matter described herein.

FIG. 4 is a flowchart illustrating a process 400 for image recognition in accordance with some implementations of the subject matter described herein. The process 400 may be implemented by the computing device 100, and for example may be implemented at the image recognition module 122 in the memory 120 of the computing device 100. At 410, a global feature of an image is extracted using a first sub-network of a first learning network. At 420, a first attention region of the image is determined based on the global feature using a second sub-network of the first learning network. The first attention region comprises a discriminative portion of an object in the image. At 430, a first local feature of the first attention region is extracted using a first sub-network of a second learning network. In 440, a category of the object in the image is determined based at least in part on the first local feature.

In some implementations, determining the category of the object in the image based at least in part on the first local feature comprises: determining a second attention region of the image based on the first local feature using a second sub-network of the second learning network. The second attention region is comprised in the first attention region and comprises a discriminative sub-portion of the object in the image; extracting a second local feature of the second attention region using a third learning network; and determining the category of the object in the image based at least in part on the second local feature.

In some implementations, determining the category of the object in the image based at least in part on the second local feature may further comprise: determining the category of the object in the image further based on at least one of the global feature and the first local feature.

In some implementations, extracting a first local feature of a first attention region using a first sub-network of a second learning network may comprise: zooming in on the first attention region; and extracting the first local feature of the zoomed-in first attention region using the first sub-network of the second learning network.

In some implementations, determining the first attention region of the image based on the global feature may comprise: determining, based on the global feature, a location parameter indicative of a location of the first attention region in the image using the second sub-network of the first learning network; and determining the first attention region from the image based on the location parameter.

In some implementations, determining the category of the object in the image based at least in part on the first local feature may comprise: determining, based at least in part on the first local feature, the category of the object in the image from a plurality of predetermined categories, the plurality of predetermined categories comprising a plurality of fine-grained categories in a general category to which the object belongs.

Figure 5:
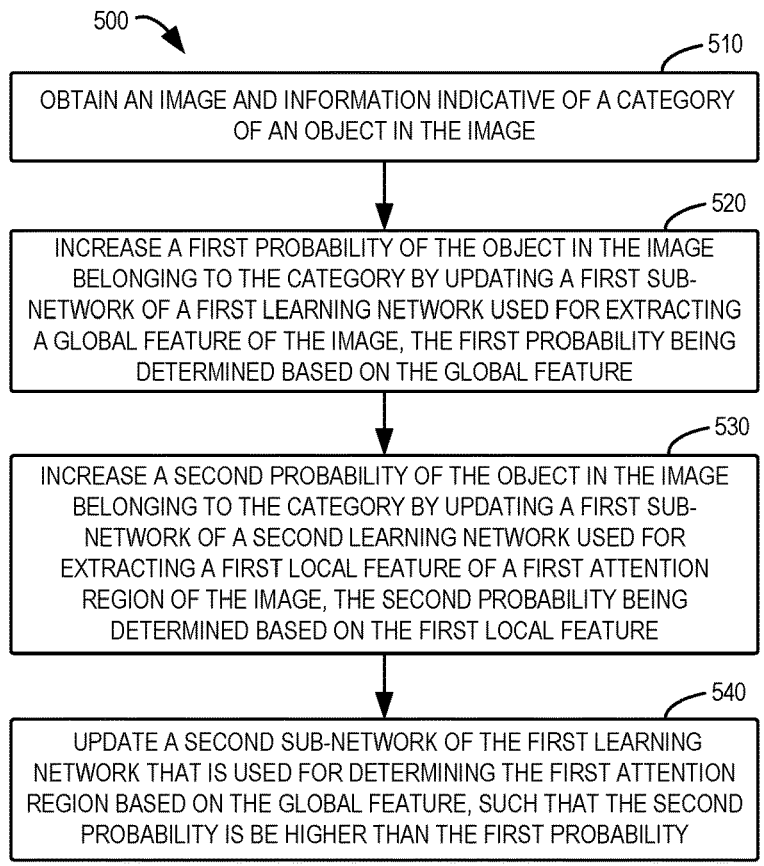
FIG. 5 is a flowchart of a process of training a learning network for image recognition in accordance with implementations of the subject matter described herein.

FIG. 5 is a flowchart of a process 500 of training a learning network for image recognition in accordance with some implementations of the subject matter described herein. The process 500 may be implemented by the computing device 100 or other computing or serve devices. At 510, an image and information indicative of a category of an object in the image is obtained. At 520, a first probability of the object in the image belonging to the category by updating a first sub-network of a first learning network used for extracting a global feature of the image, the first probability being determined based on the global feature is increased. At 530, a second probability of the object in the image belonging to the category by updating a first sub-network of a second learning network used for extracting a first local feature of a first attention region of the image, the second probability being determined based on the first local feature, and the first attention region comprising a discriminative portion of the object in the image is increased, the first attention region comprising a discriminative portion of the object in the image. In 540, a second sub-network of the first learning network is updated, the second sub-network of the first learning network being used for determining the first attention region based on the global feature, such that the second probability is be higher than the first probability.

In some implementations, the process 500 may further comprise: increasing a third probability of the object in the image belonging to the category by updating a third learning network used for extracting a second local feature of a second attention region comprised in the first attention region, the third probability being determined based on the second local feature, and the second attention region comprising a discriminative sub-portion of the object in the image; and updating a second sub-network of the second learning network used for determining the second attention region based on the first local feature, such that the third probability is higher than the second probability.

In some implementations, updating the second sub-network of the first learning network may comprise: updating the second sub-network of the first learning network while maintaining parameters of the updated first sub-network of the first learning network and the updated first sub-network of the second learning network fixed.

In some implementations, updating the first sub-network of the first learning network may comprise: initializing the first sub-network of the first learning network based on a further image and further information indicative of a category of an object in the further image; and updating the initialized first sub-network of the first learning network.

In some implementations, updating the first sub-network of the second learning network may comprise: zooming in on the first attention region; and updating the first sub-network of the second learning network to extract the first local feature from the zoomed-in first attention region.

In some implementations, updating the second sub-network of the first learning network may comprise: updating the second sub-network of the first learning network to determine a location parameter indicative of a location of the first attention region in the image based on the global feature, the location parameter being provided for identifying the first attention region from the image.

In some implementations, updating the second sub-network of the first learning network may comprise: initializing the location parameter; initializing the second sub-network of the first learning network based on the initialized location parameter; and updating the initialized second sub-network of the first learning network.

In some implementations, the category of the object in the image comprises one of a plurality of fine-grained categories in a general category to which the object belongs.

Example Implementations

Some example implementations of the subject matter described herein are listed below.

In one aspect, there is provided a device in the subject matter described herein. The device comprises: a processing unit; and a memory coupled to the processing unit and having instructions stored thereon. The instructions, when executed by the processing unit, cause the device to perform acts comprising: extracting a global feature of an image using a first sub-network of a first learning network; determining a first attention region of the image based on the global feature using a second sub-network of the first learning network, the first attention region comprising a discriminative portion of an object in the image; extracting a first local feature of the first attention region using a first sub-network of a second learning network; and determining a category of the object in the image based at least in part on the first local feature.

In some implementations, determining the category of the object in the image based at least in part on the first local feature comprises: determining a second attention region of the image based on the first local feature using a second sub-network of the second learning network. The second attention region is comprised in the first attention region and comprises a discriminative sub-portion of the object in the image; extracting a second local feature of the second attention region using a third learning network; and determining the category of the object in the image based at least in part on the second local feature.

In some implementations, determining the category of the object in the image based at least in part on the second local feature comprises: determining the category of the object in the image further based on at least one of the global feature and the first local feature.

In some implementations, extracting a first local feature of a first attention region using a first sub-network of a second learning network comprises: zooming in on the first attention region; and extracting the first local feature of the zoomed-in first attention region using the first sub-network of the second learning network.

In some implementations, determining the first attention region of the image based on the global feature comprises: determining, based on the global feature, a location parameter indicative of a location of the first attention region in the image using the second sub-network of the first learning network; and determining the first attention region from the image based on the location parameter.

In some implementations, determining the category of the object in the image based at least in part on the first local feature comprises: determining, based at least in part on the first local feature, the category of the object in the image from a plurality of predetermined categories, the plurality of predetermined categories comprising a plurality of fine-grained categories in a general category to which the object belongs.

In a further aspect, there is provided a device in the subject matter described herein. The device comprises: a processing unit; and a memory coupled to the processing unit and having instructions stored thereon. The instructions, when executed by the processing unit, cause the device to perform acts comprising: obtaining an image and information indicative of a category of an object in the image; increasing a first probability of the object in the image belonging to the category by updating a first sub-network of a first learning network used for extracting a global feature of the image, the first probability being determined based on the global feature; increasing a second probability of the object in the image belonging to the category by updating a first sub-network of a second learning network used for extracting a first local feature of a first attention region of the image, the second probability being determined based on the first local feature, and the first attention region comprising a discriminative portion of the object in the image; and updating a second sub-network of the first learning network that is used for determining the first attention region based on the global feature, such that the second probability is be higher than the first probability.

In some implementations, the acts further comprise: increasing a third probability of the object in the image belonging to the category by updating a third learning network used for extracting a second local feature of a second attention region comprised in the first attention region, the third probability being determined based on the second local feature, and the second attention region comprising a discriminative sub-portion of the object in the image; and updating a second sub-network of the second learning network used for determining the second attention region based on the first local feature, such that the third probability is higher than the second probability.

In some implementations, updating the second sub-network of the first learning network comprises: updating the second sub-network of the first learning network while maintaining parameters of the updated first sub-network of the first learning network and the updated first sub-network of the second learning network fixed.

In some implementations, updating the first sub-network of the first learning network comprises: initializing the first sub-network of the first learning network based on a further image and further information indicative of a category of an object in the further image; and updating the initialized first sub-network of the first learning network.

In some implementations, updating the first sub-network of the second learning network comprises: zooming in on the first attention region; and updating the first sub-network of the second learning network to extract the first local feature from the zoomed-in first attention region.

In some implementations, updating the second sub-network of the first learning network comprises: updating the second sub-network of the first learning network to determine a location parameter indicative of a location of the first attention region in the image based on the global feature, the location parameter being provided for identifying the first attention region from the image.

In some implementations, updating the second sub-network of the first learning network comprises: initializing the location parameter; initializing the second sub-network of the first learning network based on the initialized location parameter; and updating the initialized second sub-network of the first learning network.

In some implementations, the category of the object in the image comprises one of a plurality of fine-grained categories in a general category to which the object belongs.

In a further aspect, there is provided a computer-implemented method in the subject matter described herein, comprising: extracting a global feature of an image using a first sub-network of a first learning network; determining a first attention region of the image based on the global feature using a second sub-network of the first learning network, the first attention region comprising a discriminative portion of an object in the image; extracting a first local feature of the first attention region using a first sub-network of a second learning network; and determining a category of the object in the image based at least in part on the first local feature.

In some implementations, determining the category of the object in the image based at least in part on the first local feature comprises: determining a second attention region of the image based on the first local feature using a second sub-network of the second learning network. The second attention region is comprised in the first attention region and comprises a discriminative sub-portion of the object in the image; extracting a second local feature of the second attention region using a third learning network; and determining the category of the object in the image based at least in part on the second local feature.

In some implementations, determining the category of the object in the image based at least in part on the second local feature comprises: determining the category of the object in the image further based on at least one of the global feature and the first local feature.

In some implementations, extracting a first local feature of a first attention region using a first sub-network of a second learning network comprises: zooming in on the first attention region; and extracting the first local feature of the zoomed-in first attention region using the first sub-network of the second learning network.

In some implementations, determining the first attention region of the image based on the global feature comprises: determining, based on the global feature, a location parameter indicative of a location of the first attention region in the image using the second sub-network of the first learning network; and determining the first attention region from the image based on the location parameter.

In some implementations, determining the category of the object in the image based at least in part on the first local feature comprises: determining, based at least in part on the first local feature, the category of the object in the image from a plurality of predetermined categories, the plurality of predetermined categories comprising a plurality of fine-grained categories in a general category to which the object belongs.

In a yet further aspect, there is provided a computer-implemented method in the subject matter described herein, comprising: obtaining an image and information indicative of a category of an object in the image; increasing a first probability of the object in the image belonging to the category by updating a first sub-network of a first learning network used for extracting a global feature of the image, the first probability being determined based on the global feature; increasing a second probability of the object in the image belonging to the category by updating a first sub-network of a second learning network used for extracting a first local feature of a first attention region of the image, the second probability being determined based on the first local feature, and the first attention region comprising a discriminative portion of the object in the image; and updating a second sub-network of the first learning network that is used for determining the first attention region based on the global feature, such that the second probability is be higher than the first probability.

In some implementations, the method further comprises: increasing a third probability of the object in the image belonging to the category by updating a third learning network used for extracting a second local feature of a second attention region comprised in the first attention region, the third probability being determined based on the second local feature, and the second attention region comprising a discriminative sub-portion of the object in the image; and updating a second sub-network of the second learning network used for determining the second attention region based on the first local feature, such that the third probability is higher than the second probability.

In some implementations, updating the second sub-network of the first learning network comprises: updating the second sub-network of the first learning network while maintaining parameters of the updated first sub-network of the first learning network and the updated first sub-network of the second learning network fixed.

In some implementations, updating the first sub-network of the first learning network comprises: initializing the first sub-network of the first learning network based on a further image and further information indicative of a category of an object in the further image; and updating the initialized first sub-network of the first learning network.

In some implementations, updating the first sub-network of the second learning network comprises: zooming in on the first attention region; and updating the first sub-network of the second learning network to extract the first local feature from the zoomed-in first attention region.

In some implementations, updating the second sub-network of the first learning network comprises: updating the second sub-network of the first learning network to determine a location parameter indicative of a location of the first attention region in the image based on the global feature, the location parameter being provided for identifying the first attention region from the image.

In some implementations, updating the second sub-network of the first learning network comprises: initializing the location parameter; initializing the second sub-network of the first learning network based on the initialized location parameter; and updating the initialized second sub-network of the first learning network.

In some implementations, the category of the object in the image comprises one of a plurality of fine-grained categories in a general category to which the object belongs.

In a further aspect, there is provided a computer program product in the subject matter described herein, which is tangibly stored in a non-transient computer storage medium and includes computer executable instructions which, when executed by a device, cause the device to perform any of the methods according the above aspects.

In a further aspect, there is provided a computer readable medium in the subject matter described herein, the computer readable medium having computer executable instructions stored thereon which, when executed by a device, cause the device to perform any of the methods according the above aspects.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device, comprising:
    a stacked learning network that is implemented in an image recognition module of the device, the stacked learning network comprising a first learning network, a second learning network, and a third learning network, wherein each of the first, second, and third learning networks are different learning networks, each of the first learning network and the second learning network comprising a first sub-network for feature extraction, a second sub-network for determining an image attention region, and a third sub-network for image categorization, wherein each of the first, second, and third sub-networks are different sub-networks;
    a processing unit; and
    a memory coupled to the processing unit and having instructions stored thereon which, when executed by the processing unit, cause the device to perform acts comprising:
        extracting a global feature of an image using the first sub-network of the first learning network;
        determining a first attention region of the image based on the global feature using the second sub-network of the first learning network, the first attention region comprising a discriminative portion of an object in the image;
        extracting a first local feature of the first attention region using the first sub-network of the second learning network;
        determining a second attention region of the image based on the first local feature using the second sub-network of the second learning network, the second attention region being comprised in the first attention region and comprising a discriminative sub-portion of the object in the image;
        extracting a second local feature of the second attention region using the third learning network; and
        determining a category of the object in the image based on at least one of the first local feature or the second local feature using the third sub-network of the third learning network.

2. The device of claim 1, wherein determining the category of the object in the image based on at least one of the first local feature or the second local feature further comprises:
    determining the category of the object in the image further based on the global feature.

3. The device of claim 1, wherein extracting the first local feature of the first attention region using the first sub-network of the second learning network comprises:
    zooming in on the first attention region; and
    extracting the first local feature of the zoomed-in first attention region using the first sub-network of the second learning network.

4. The device of claim 1, wherein determining the first attention region of the image based on the global feature comprises:
    determining, based on the global feature, a location parameter indicative of a location of the first attention region in the image using the second sub-network of the first learning network; and
    determining the first attention region from the image based on the location parameter.

5. A method implemented by a computer, comprising:
    extracting a global feature of an image using a first sub-network of a first learning network, wherein the first learning network, a second learning network, and a third learning network form a stacked learning network that is implemented in an image recognition module of the computer, wherein each of the first, second, and third learning networks are different learning networks, each of the first learning network and the second learning network comprising a first sub-network for feature extraction, a second sub-network for determining an image attention region, and a third sub-network for image categorization, wherein each of the first, second, and third sub-networks are different sub-networks;
    determining a first attention region of the image based on the global feature using the second sub-network of the first learning network, the first attention region comprising a discriminative portion of an object in the image;
    extracting a first local feature of the first attention region using the first sub-network of the second learning network;
    determining a second attention region of the image based on the first local feature using the second sub-network of the second learning network, the second attention region being comprised in the first attention region and comprising a discriminative sub-portion of the object in the image;
    extracting a second local feature of the second attention region using the third learning network; and
    determining a category of the object in the image based on at least one of the first local feature or the second local feature using the third sub-network of the third learning network.

6. The method of claim 5, wherein extracting the first local feature of the first attention region using the first sub-network of the second learning network comprises:
    zooming in on the first attention region; and
    extracting the first local feature of the zoomed-in first attention region, using the first sub-network of the second learning network.

7. The method of claim 5, wherein determining the first attention region of the image based on the global feature comprises:
    determining, based on the global feature, a location parameter indicative of a location of the first attention region in the image using the second sub-network of the first learning network; and
    determining the first attention region from the image based on the location parameter.

8. A system comprising:
    a processing unit; and
    memory coupled to the processing unit, the memory comprising computer executable instructions that, when executed by the processing unit, perform operations comprising:

extracting a global feature of an image using a first sub-network of a first learning network, wherein the first learning network, a second learning network, and a third learning network form a stacked learning network that is implemented in an image recognition module, wherein each of the first, second, and third learning networks are different learning networks, each of the first learning network and the second learning network comprising a first sub-network for feature extraction, a second sub-network for determining an image attention region, and a third sub-network for image categorization, wherein each of the first, second, and third sub-networks are different sub-networks;

determining a first attention region of the image based on the global feature using the second sub-network of the first learning network, the first attention region comprising a discriminative portion of an object in the image;

extracting a first local feature of the first attention region using the first sub-network of the second learning network;

determining a second attention region of the image based on the first local feature using the second sub-network of the second learning network, the second attention region being comprised in the first attention region and comprising a discriminative sub-portion of the object in the image;

extracting a second local feature of the second attention region using the third learning network; and determining a category of the object in the image based on at least one of the first local feature or the second local feature using the third sub-network of the third learning network.

9. The system of claim 8, wherein the first sub-network and the second sub-network process the image at a different scale of a plurality of scales, the plurality of scales ranging from a full image to a fine-grained region of the full image.

10. The system of claim 8, wherein the global feature indicates feature information of the object or a background of the image.

11. The system of claim 10, wherein the feature information is at least one of:
a color;
a profile;
an edge; or
a line.

12. The system of claim 8, wherein the second sub-network is comprised of a convolutional neural network including one or more convolutional layers, activation layers, or pooling layers for extracting feature maps.

13. The system of claim 8, wherein extracting the first local feature of the first attention region using the first sub-network of the second learning network comprises:
zooming in on the first attention region; and
extracting the first local feature of the zoomed-in first attention region using the first sub-network of the second learning network.

14. The system of claim 13, wherein zooming in on the first attention region comprises:
zooming in on the first attention region; and
expanding a size of the first attention region to match a size of the image using bilinear interpolation.

15. The system of claim 8, wherein the second learning network further comprises a fully-connected (FC) layer for mapping the first local feature to a feature vector.

16. The system of claim 15, wherein the feature vector includes one or more elements corresponding to one or more object categories.

17. The system of claim 16, wherein the second learning network further comprises a multinomial logistic regression layer for determining an object category from the one or more object categories.

18. The system of claim 17, wherein determining the object category from the one or more object categories is based on an output of the FC layer.

19. The system of claim 18, wherein the multinomial logistic regression layer converts the output of the FC layer into respective probabilities for the one or more object categories.

20. The system of claim 19, wherein determining the category of the object in the image based on at least one of the first local feature or the second local feature comprises:
identifying the object category has a highest probability of the one or more object categories; and
selecting the object category as the category of the object in the image based on the highest probability.

* * * * *